(12) United States Patent
Fujii et al.

(10) Patent No.: US 11,429,470 B2
(45) Date of Patent: Aug. 30, 2022

(54) SIGNAL PROCESSING CIRCUIT

(71) Applicant: LAPIS Semiconductor Co., Ltd., Yokohama (JP)

(72) Inventors: Naohiro Fujii, Yokohama (JP); Yuki Imatoh, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/928,376

(22) Filed: Jul. 14, 2020

(65) Prior Publication Data
US 2021/0019216 A1    Jan. 21, 2021

(30) Foreign Application Priority Data

Jul. 18, 2019    (JP) .............................. JP2019-132618

(51) Int. Cl.
| | |
|---|---|
| *G06F 11/00* | (2006.01) |
| *G06F 11/07* | (2006.01) |
| *G06F 11/273* | (2006.01) |

(52) U.S. Cl.
CPC ........ *G06F 11/0763* (2013.01); *G06F 11/079* (2013.01); *G06F 11/0772* (2013.01); *G06F 11/273* (2013.01)

(58) Field of Classification Search
CPC ............. G06F 11/0763; G06F 11/0772; G06F 11/079; H04N 5/147; H04N 17/002
See application file for complete search history.

(56) References Cited

U.S. PATENT DOCUMENTS

| | | | |
|---|---|---|---|
| 9,826,252 B2* | 11/2017 | Wendel | H04N 19/89 |
| 9,955,150 B2* | 4/2018 | Gulati | H04N 17/004 |
| 2009/0147861 A1* | 6/2009 | Schnebly | G06T 1/0085 |
| | | | 375/240.27 |
| 2010/0283858 A1* | 11/2010 | Katchan | G09G 5/006 |
| | | | 348/189 |
| 2013/0235014 A1* | 9/2013 | Lee | G06F 1/3265 |
| | | | 345/211 |
| 2015/0281742 A1* | 10/2015 | Staudenmaier | H04N 19/89 |
| | | | 375/240.27 |
| 2020/0244841 A1* | 7/2020 | Ichikawa | G06K 9/00765 |

FOREIGN PATENT DOCUMENTS

JP    2018-079839 A    5/2018

* cited by examiner

*Primary Examiner* — Philip Guyton
(74) *Attorney, Agent, or Firm* — Rabin & Berdo, P.C.

(57) ABSTRACT

A signal processing circuit has: n+1 (n being an integer of 2 or greater) operation circuits, each of which is configured to execute a prescribed operation process on inputted data; a signal supply unit that is configured to receive n pieces of input data extracted from one input signal and receive test data inputted separately from the n pieces of input data, sequentially select one operation circuit among the n+1 operation circuits and supply the test data to the one selected operation circuit, and supply the n pieces of input data to n operation circuits other than the one operation circuit among the n+1 operation circuits; and an anomaly determination unit that is configured to determine whether an anomaly has occurred in the one operation circuit on the basis of an operation result of an operation on the test data by the one operation circuit.

8 Claims, 8 Drawing Sheets

SIGNAL PROCESSING CIRCUIT

CROSS REFERENCE TO RELATED APPLICATIONS

This application is based upon and claims the benefit of priority of the prior Japanese Patent Application No. 2019-132618, filed on Jul. 18, 2019, the entire contents of which are incorporated herein by reference.

BACKGROUND

Technical Field

The present invention relates to a signal processing circuit, and in particular, relates to a signal processing circuit that performs signal processing in order to detect anomalies in an operation circuit that performs operations on an image signal.

Background Art

Currently, an in-vehicle display system that displays, in a vehicle-installed display, an image of an area in front of a vehicle or an image of an area to the rear of a vehicle captured by vehicle-installed cameras in order to perform driving aid for a driver of the vehicle has been proposed (see, for example, Japanese Patent Application Laid-Open Publication No. 2018-79839).

In this in-vehicle display system, if a so-called image freeze is detected in which an image based on an image signal captured by a camera is not changing despite the landscape that should be captured by the camera changing, a freeze handling process that issues a notification that an image freeze has occurred is performed. This image freeze occurs when the camera capturing the landscape while the vehicle is in motion encounters a fault, and the camera that has encountered the fault enters a state of repeatedly outputting one frame of image data that was captured immediately prior to the fault occurring, for example.

In this in-vehicle display system, the image is determined to have frozen if the image data of the current frame captured by the camera is compared to the image data from one frame prior and both pieces of image data match each other. In general, the volume of the image data is large, and thus, if pieces of image data are directly compared to each other, this results in the comparison process taking up a heavy load. In order to reduce this load, in this in-vehicle display system, instead of comparing the two pieces of image data to each other, hash values yielded by subjecting the two pieces of image data to secure hash algorithms (SHA), the message digest 5 (MD5) algorithm, cyclic redundancy check (CRC), or the like are compared to each other, for example.

SUMMARY OF THE INVENTION

Problems to be Solved by the Invention

In the aforementioned in-vehicle display system, if an anomaly occurs in the very detection circuit that detects image freeze, then the detection cannot be performed accurately. One possible measure to solve this problem is to provide a separate host diagnosis circuit for detecting that an anomaly has occurred in the detection circuit, thereby detecting the anomaly in the detection circuit.

For example, if the detection circuit is constituted of a plurality of operation circuits and a determination circuit that determines operation results thereof, a host device diagnosis circuit having the same number of operation circuits corresponding to the operation circuits in the detection circuit is used to compare the operation results of the plurality of operation circuits in the detection circuit to the operation results of the corresponding operation circuits in the host device diagnosis circuit to determine whether the operation results match, thereby determining if an anomaly has occurred in each operation circuit.

However, in the case of anomaly detection using this host device diagnosis circuit, there is a need to provide the same number of operation circuits in the host device diagnosis circuit as there are of the plurality of operation circuits provided in the detection circuit, which presents the problem of a large circuit size as well as the possibility of impeding other large-scale integration (LSI). Also, if even one operation circuit in the detection circuit malfunctions, an anomalous value is inputted to the determination circuit, which presents the problem that the determination results outputted from the determination circuit would no longer be usable.

The present invention takes into account the above-mentioned problems and an object thereof is to provide a signal processing circuit that can perform detection of anomalies in each of a plurality of operation circuits in a circuit concurrently with the operations of the operation circuits, while mitigating an increase in circuit size.

Means for Solving the Problems

A signal processing circuit according to embodiments of the present invention includes: n+1 (n being an integer of 2 or greater) operation circuits, each of which is configured to execute a prescribed operation process on inputted data; a signal supply unit that is configured to receive n pieces of input data extracted from one input signal and receive test data inputted separately from the n pieces of input data, sequentially select one operation circuit among the n+1 operation circuits and supply the test data to the one selected operation circuit, and supply the n pieces of input data to n operation circuits other than the one operation circuit among the n+1 operation circuits; and an anomaly determination unit that is configured to determine whether an anomaly has occurred in the one operation circuit on the basis of an operation result of an operation on the test data by the one operation circuit.

Also, a signal processing circuit according to embodiments of the present invention includes: n+k (n and k being integers of 2 or greater) operation circuits, each of which is configured to execute a prescribed operation process on inputted data; a signal supply unit that is configured to receive n pieces of input data extracted from one input signal and receive test data inputted separately from the n pieces of input data, sequentially select k operation circuits among the n+k operation circuits as selected circuits and supply the test data to the selected circuits, and supply the n pieces of input data to operation circuits other than the selected circuits among the n+k operation circuits; and an anomaly determination unit that is configured to determine whether an anomaly has occurred in the selected circuits on the basis of operation results of operations on the test data by the selected circuits.

Effects of the Invention

According to the signal processing circuit having the plurality of operation circuits of the embodiments of the present invention, it is possible to perform detection of anomalies in each of the plurality of operation circuits concurrently with the operations of the operation circuits while mitigating an increase in circuit size.

DETAILED DESCRIPTION OF EMBODIMENTS

Figure 1:
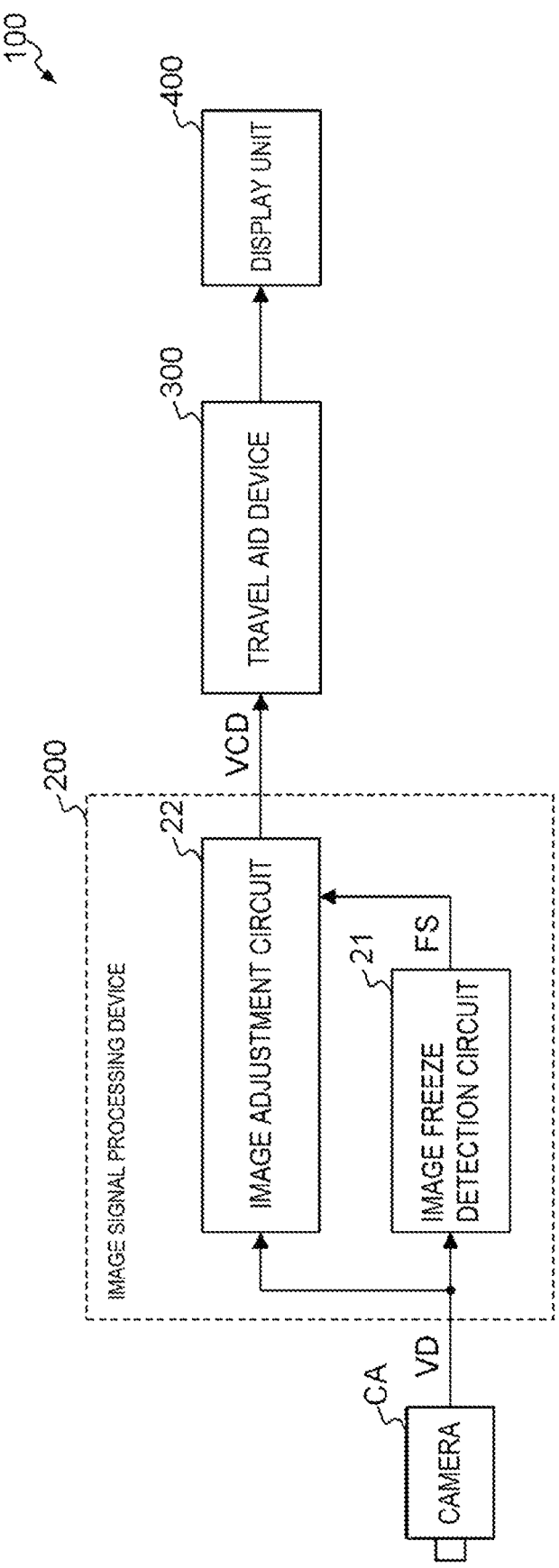
FIG. 1 is a block diagram showing a schematic configuration of a driving aid system according to an embodiment (Embodiment 1) of the present invention.

Suitable embodiments of the present invention will be explained below in detail. In the description of embodiments and the affixed drawings below, parts that are substantially the same or equivalent to each other are assigned the same reference characters.

Embodiment 1

FIG. 1 is a block diagram showing a schematic configuration of a driving aid system 100 according to Embodiment 1 of the present invention. The driving aid system 100 has a camera CA, an image signal processing device 200, a travel aid device 300, and a display unit 400.

The camera CA is installed in a vehicle, captures an area to the front of the vehicle, an area to the rear of the vehicle, and areas to the sides of the vehicle, generates an image signal including a pixel data sequence corresponding to respective pixels, and supplies the pixel data sequence to the image signal processing device 200 as a captured image signal VD. The image signal can include a series of frames.

The image signal processing device 200 includes an image freeze detection circuit 21 and an image adjustment circuit 22. The image freeze detection circuit 21 detects the presence or absence of a so-called frozen state in which the image captured by the camera CA has not changed, on the basis of the captured image signal VD, and supplies a freeze detection signal FS indicating this detection result to the image adjustment circuit 22. In other words, the image freeze detection circuit 21 supplies, to the image adjustment circuit 22, the freeze detection signal FS, which indicates "frozen" if the captured image is in a frozen state and "non-frozen" if the captured image is not in a frozen state.

Upon receiving a freeze detection signal FS indicating "non-frozen," the image adjustment circuit 22 supplies, as a captured image signal VCD to the travel aid device 300, a signal attained by performing adjustments on properties of the captured image signal VD such as the hue, luminance, and contrast. On the other hand, if a freeze detection signal FS indicating "frozen" is received, the image adjustment circuit 22 supplies, as a captured image signal VCD to the travel aid device 300, an image signal indicating the frozen state. For example, the image adjustment circuit 22 supplies, to the travel aid device 300, a captured image signal VCD indicating that the captured image is frozen using text or displaying a single color (such as blue) on the entire screen.

On the basis of the captured image signal VCD, the travel aid device 300 performs various types of travel aid control such as inter-vehicle control in which the host vehicle travels at a given distance from a vehicle to the front thereof, lane departure prevention control to prompt vehicular travel within the travel lane, proximity notification control for notifying that the host vehicle is in close proximity to another vehicle, and collision avoidance control. In doing so, the travel aid device 300 supplies, as a travel aid image signal to the display unit 400, an image displaying various warnings or instruction messages pertaining to the travel aid control. The travel aid device 300 may supply, as a monitor image signal to the display unit 400, an image signal in which a warning or instruction message is superimposed on an image based on the captured image signal VCD or the captured image signal VCD itself.

Additionally, the travel aid device 300 has a navigation function for navigating the host vehicle from the current location to a destination, and supplies, to the display unit 400, a map image signal showing a map image of the area surrounding the current location of the host vehicle.

The display unit 400 includes, in addition to a main display that displays an image based on the map image signal and the travel aid image signal, a light-emitting indicator installed on a door mirror or a rearward monitoring display that satisfies the function of the interior mirror, for example. When the camera CA captures the landscape to the rear of the vehicle, for example, the rearward monitoring display displays an image based on the captured image signal VCD. If the image freeze detection circuit 21 detects that the image captured by the camera CA is in a frozen state, the main display and the rearward monitoring display indicate the frozen state by text or by displaying a single color on the entire screen.

The image freeze detection circuit 21 of the present embodiment includes a plurality of operation circuits for detecting whether or not the captured image is in a frozen state, and an anomaly determination circuit that determines whether or not any of the plurality of operation circuits has encountered an anomaly. Below, the configuration and operations of the image freeze detection circuit 21 will be described.

Figure 2:
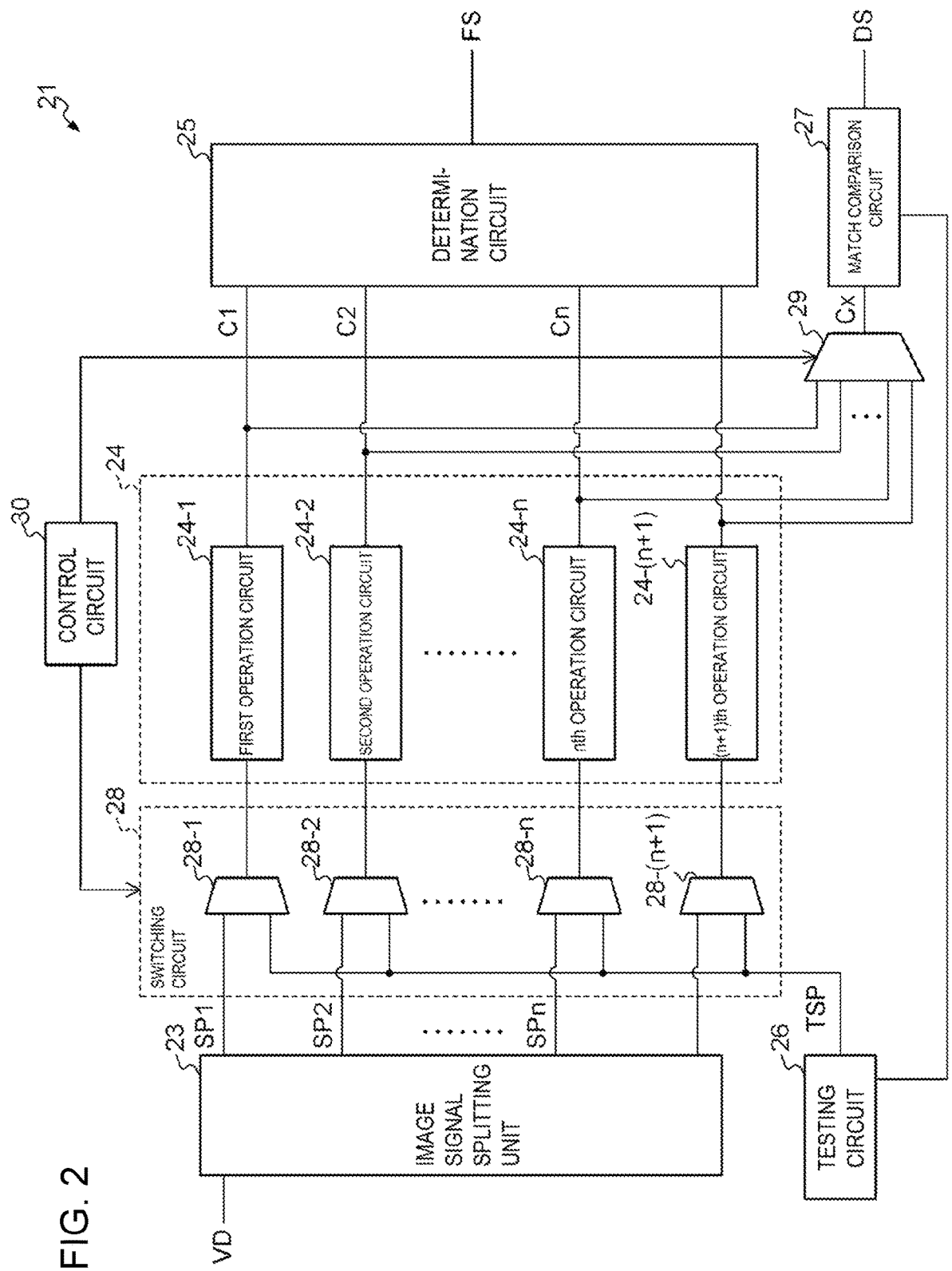
FIG. 2 is a block diagram showing a configuration of an image freeze detection circuit according to Embodiment 1.

FIG. 2 is a block diagram showing a configuration of the image freeze detection circuit 21. The image freeze detection circuit 21 includes an image signal splitting unit 23, an operation circuit block 24, a determination circuit 25, a testing circuit 26, a match comparison circuit 27, a switching circuit block 28, a selector 29, and a control circuit 30. The image signal splitting unit 23, the operation circuit block 24, and the determination circuit 25 are circuit units corresponding to typical detection circuits that execute processes for detecting whether or not the captured image is in a frozen state. On the other hand, the testing circuit 26, the match comparison circuit 27, the switching circuit block 28, the selector 29, and the control circuit 30 are circuit units corresponding to an anomaly determination circuit provided in order to determine whether an anomaly has occurred in any of the operation circuits in the operation circuit block 24. Further, the operation circuit block 24 may correspond to the (n+1) operation circuits, and the switching circuit block 28 may correspond to the signal supply unit.

The image signal splitting unit 23 splits the captured image signal VD into n (n being an integer of 3 or greater) split image signals SP1 to SPn for each piece of pixel data for one frame of the captured image signal VD. For example, the captured image signal VD is constituted of 8-bit pixel data representing the red luminance level, 8-bit pixel data representing the green luminance level, and 8-bit pixel data representing the blue luminance level. In this case, n=24, and the image signal splitting unit 23 splits the captured image signal VD into 24 split image signals SP1 to SP24 for each bit digit of each piece of RGB pixel data.

The operation circuit block 24 is constituted of a first operation circuit 24-1, a second operation circuit 24-2, ... an nth operation circuit 24-$n$, and an (n+1)th operation circuit 24-($n$+1). In other words, the operation circuit block 24 is constituted of n+1 operation circuits that each execute an operation process for detecting a frozen state for the image.

Next, the internal configuration of the first operation circuit 24-1, which is one operation circuit among the first operation circuit 24-1 to (n+1)th operation circuit 24-($n$+1), will be described as a selected example.

Figure 3:
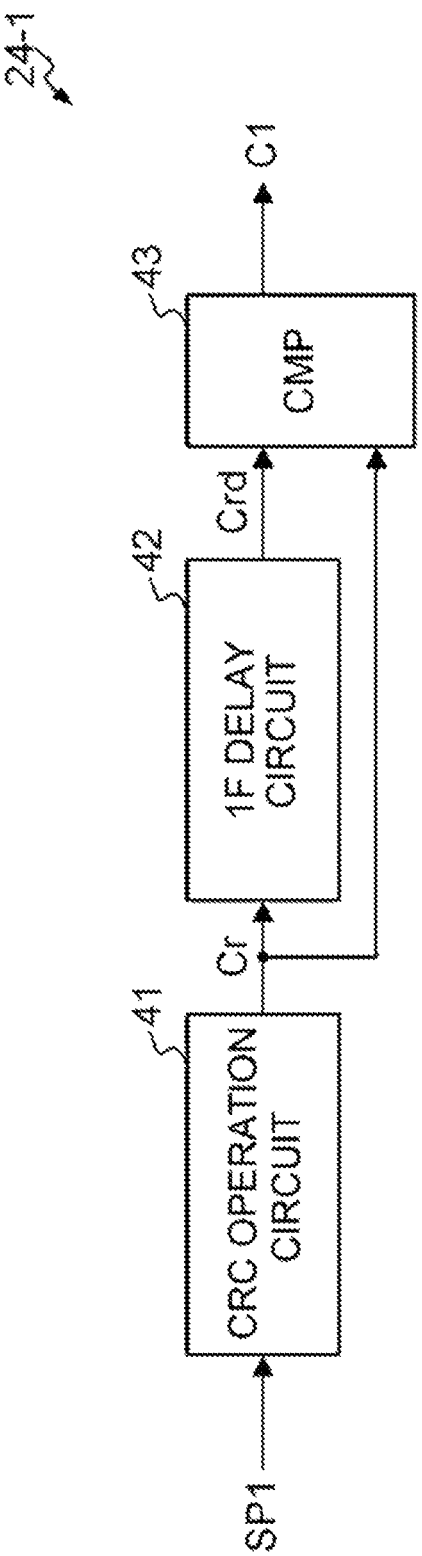
FIG. 3 is a block diagram showing the internal configuration of a first operation circuit according to Embodiment 1.

FIG. 3 is a circuit block showing the internal configuration of the first operation circuit 24-1. The first operation circuit 24-1 is constituted of a CRC operation circuit 41, a 1F delay circuit 42, and a comparator (CMP) circuit 43.

The CRC operation circuit 41 takes in, for each frame, a bit sequence of pixels in the split image signal SP1 supplied from the image signal splitting unit 23, and executes a CRC (cyclic redundancy check) operation on the bit sequence. In other words, the CRC operation circuit 41 calculates, as a test value Cr, the remainder from division of a bit sequence corresponding to each frame by a prescribed generator polynomial. The 1F delay circuit 42 supplies to the CMP circuit 43, as a delay test value Crd, a value obtained by delaying the test value Cr by one frame period. The CMP circuit 43 corresponds to a comparison circuit, for example, and determines whether or not the test value Cr equals the delay test value Crd, and outputs an image change detection signal C1 indicating "no change" if the test value equals the delay test value, whereas if the test value does not equal the delay test value, the CMP circuit 43 outputs an image change detection signal C1 indicating "change has occurred."

The second operation circuit 24-2 to the (n+1)th operation circuit 24-($n$+1) have a similar configuration. According to this configuration, the first operation circuit 24-1 to the (n+1)th operation circuit 24-($n$+1) compare the test values of adjacent frames to determine whether the image has changed between frames of the series of frames of the image signal, and generate image change detection signals that individually indicate the detection results.

The image signal processing device 200 of the present embodiment executes a test to determine whether an anomaly has occurred in any of the first operation circuit 24-1 to the (n+1)th operation circuit 24-($n$+1) (in other words, whether there is a fault), and uses the remaining operation circuits to execute the above-mentioned operation to detect the frozen state of the captured image. Thus, as shown in FIG. 2, the number of operation circuits is n+1, but the image signal splitting unit 23 supplies, to the operation circuit block 24, the split image signals SP1 to SPn, which are signals yielded by splitting the captured image signal VD into n signals, and the image change detection signals C1 to Cn, which are n operation results corresponding thereto, are outputted from the operation circuit block 24.

The determination circuit 25 determines that there is no change in the image based on the captured image signal VD if the number of image change detection signals indicating "no change," among the image change detection signals C1 to Cn outputted from the operation circuit block 24, is greater than a prescribed number L. If a state in which the image does not change continues over a period of a prescribed frame count or greater, then the freeze detection signal FS indicating "frozen" is outputted, and in periods other than the aforementioned period, the freeze detection signal FS indicating "non-frozen" is outputted.

The testing circuit 26 generates and outputs a test split image signal TSP (that is, test data) that is a split image signal used for testing. The test split image signal TSP outputted from the testing circuit 26 is supplied to the switching circuit block 28, and is then supplied to any one of the first operation circuit 24-1 to the (n+1)th operation circuit 24-($n$+1) according to switching operations in the switching circuit block 28. In other words, any one of the first operation circuit 24-1 to the (n+1)th operation circuit 24-($n$+1) is selected as a selected circuit according to the switching operations in the switching circuit block 28, and the test split image signal TSP is supplied to the selected circuit.

The match comparison circuit 27 is a comparison determination unit that compares the operation results of the operation circuit being tested to an expected value, and determines whether or not there is a match therebetween. For example, the match comparison circuit 27 has a storage unit (not shown) that stores an expected value attained as operation results for when an operation is performed on the test split image signal TSP in a state where all of the first operation circuit 24-1 to the (n+1)th operation circuit 24-($n$+1) are in a normal state (that is, a state in which there is no fault). The match comparison circuit 27 compares an image change detection signal Cx that is an operation result outputted from the operation circuit being tested to an expected value read from the storage unit, and an anomaly detection signal DS indicating "no anomaly" is outputted if the operation result matches the expected value, whereas an anomaly detection signal DS indicating "anomaly" is outputted if the operation result does not match the expected value. The anomaly detection signal DS outputted from the match comparison circuit 27 is supplied to the control circuit 30.

The switching circuit block 28 includes n selectors 28-1, 28-2, ... 28-$n$, and 28-($n$+1) provided so as to correspond to the first operation circuit 24-1 to the (n+1)th operation circuit 24-($n$+1).

The selectors 28-1 to 28-($n$+1) supply either the split image signals SP1 to SPn supplied from the image signal splitting unit 23 or the test split image signal TSP supplied from the testing circuit 26, in a manner allowing switching to the corresponding operation circuit. The switching performed by the selectors 28-1 to 28-($n$+1) is performed by switching control by the control unit 30. For example, the selector 28-1 supplies the split image signal SP1 or the test split image signal TSP to the first operation circuit 24-1 according to the switching control performed by the control circuit 30. The switching control is performed such that one of the selectors 28-1 to 28-(*n*+1) supplies the test split image signal TSP to the corresponding operation circuit, and other selectors are switch-controlled so as to supply the split image signals SP1 to SPn to the corresponding operation circuits. By this switching operation, one operation circuit that receives the test split image signal TSP is selected as the selected circuit.

The selector 29 receives operation results from the first operation circuit 24-1 to the (n+1)th operation circuit 24-(*n*+1), and supplies the operation results to the determination circuit 25 or the match comparison circuit 27 so as to enable switching therebetween. The switching by the selector 29 is performed by switching control by the control unit 30. The selector 29 of the present embodiment supplies, to the match comparison circuit 27, the operation result from one of the first operation circuit 24-1 to the (n+1)th operation circuit 24-(*n*+1), and supplies the remaining operation results to the determination circuit 25. Specifically, the switching control of the selector 29 is performed such that the operation result outputted from the operation circuit (that is, the selected circuit) that performed an operation after receiving the test split image signal TSP is supplied to the match comparison circuit 27, and the operation results outputted from the other operation circuits are supplied to the determination circuit 25.

The control circuit 30 is constituted of an MCU (microcontroller unit) or the like, and controls various components of the image freeze detection circuit 21. For example, the control circuit 30 performs switching control of the selectors 28-1 to 28-(*n*+1) of the switching circuit block 28. The control circuit 30 extracts a horizontal synchronizing signal from the captured image signal VD, and performs switching control of the switching circuit block 28 on the basis of the extracted horizontal synchronizing signal timing, for example.

The control circuit 30 performs switching control of the selectors 28-1 to 28-(*n*+1) such that the selector 28-(*n*+1) outputs the test split image signal TSP at the initial horizontal synchronizing signal timing after turning on the power source, and the other selectors (that is, the selectors 28-1 to 28-*n*) output the split image signals SP1 to SPn from the image signal splitting unit 23.

The control circuit 30 performs switching between the selector 28-(*n*+1) and the selector 28-*n* at the following horizontal synchronizing signal timing. Thus, only the selector 28-*n* outputs the test split image signal TSP, and other selectors output the split image signals SP1 to SPn. Similarly thereafter, the control circuit 30 performs switching control on the basis of the horizontal synchronizing signal such that the selector that outputs the test split image signal TSP sequentially changes from the selector 28-(*n*−1) to the selector 28-1.

Also, the control circuit 30 performs switching control of the selector 29. Specifically, the control circuit 30 switches the output destination of the signal output from the selector 29 so as to supply, to the match comparison circuit 27, the image change detection signal Cx that is the operation result of the operation circuit that has performed an operation after receiving the test split image signal TSP (that is, the operation circuit being tested), among the first operation circuit 24-1 to the (n+1)th operation circuit 24-(*n*+1), and supply the image change detection signals C1 to Cn that are the operation results of the other operation circuits to the determination circuit 25. The control circuit 30 performs switching control of the selector 29 in conjunction with the switching control of the selectors 28-1 to 28-(*n*+1).

Figure 4A:
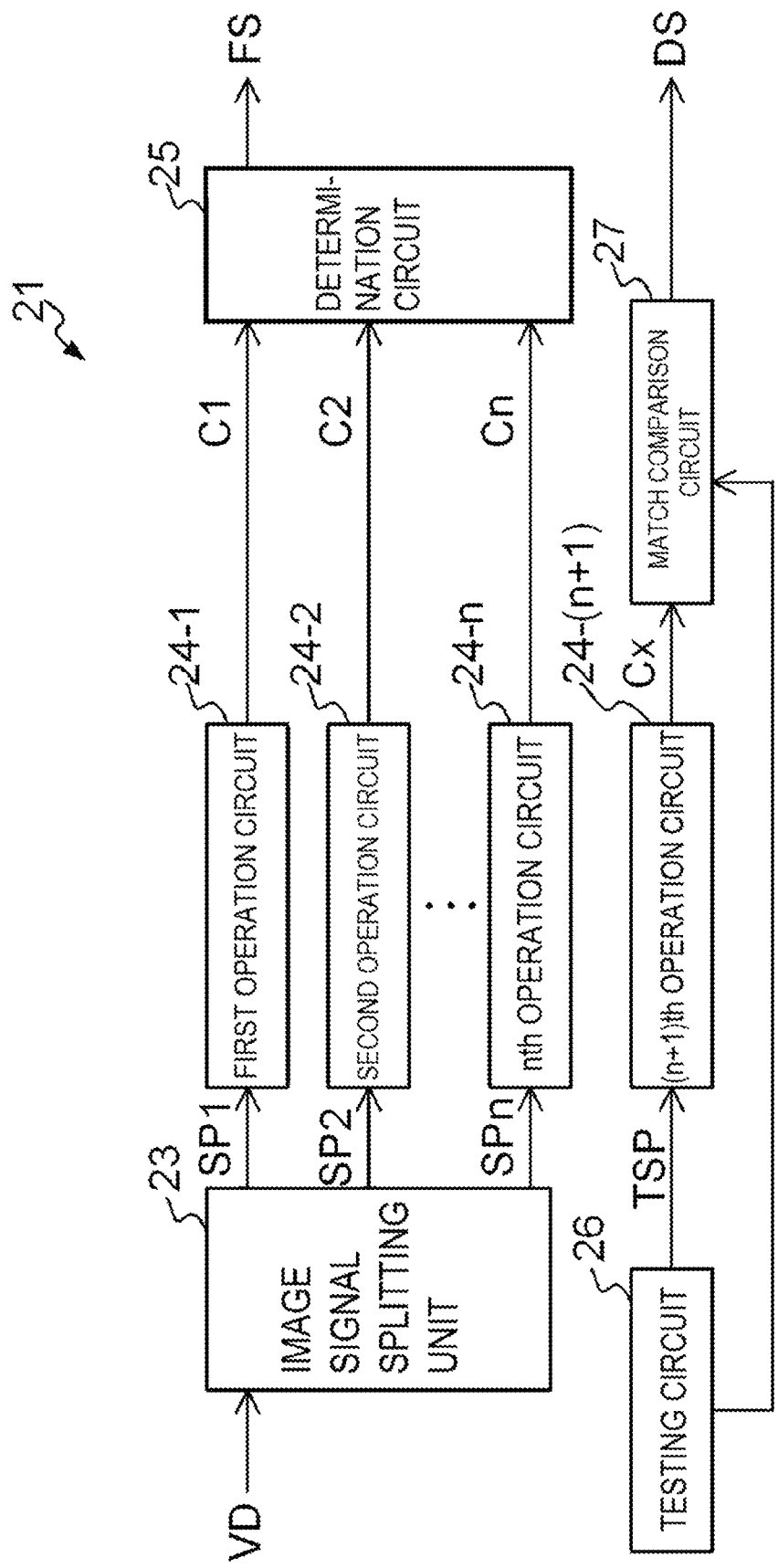
FIG. 4A is a block diagram schematically showing the connective relationship when performing a test on an (n+1)th operation circuit in Embodiment 1.

FIG. 4A is a block diagram schematically showing the supply relationship for the signals when testing the (n+1)th operation circuit. Here, the switching circuit block 28, the selector 29, and the control circuit 30 are omitted from the drawing.

The first operation circuit 24-1 to the nth operation circuit 24-*n* perform an operation after receiving the split image signals SP1 to SPn from the image signal splitting unit 23, and supply the image change detection signals C1 to Cn that are the operation results to the determination circuit 25. The (n+1)th operation circuit 24-(*n*+1) performs an operation after receiving the test split image signal TSP from the testing circuit 26 and supplies the image change detection signal Cx that is the operation result to the match comparison circuit 27. The match comparison circuit 27 compares the image change detection signal Cx to an expected value, and outputs the anomaly detection signal DS indicating "no anomaly" or "anomaly" on the basis of the comparison results.

Figure 4B:
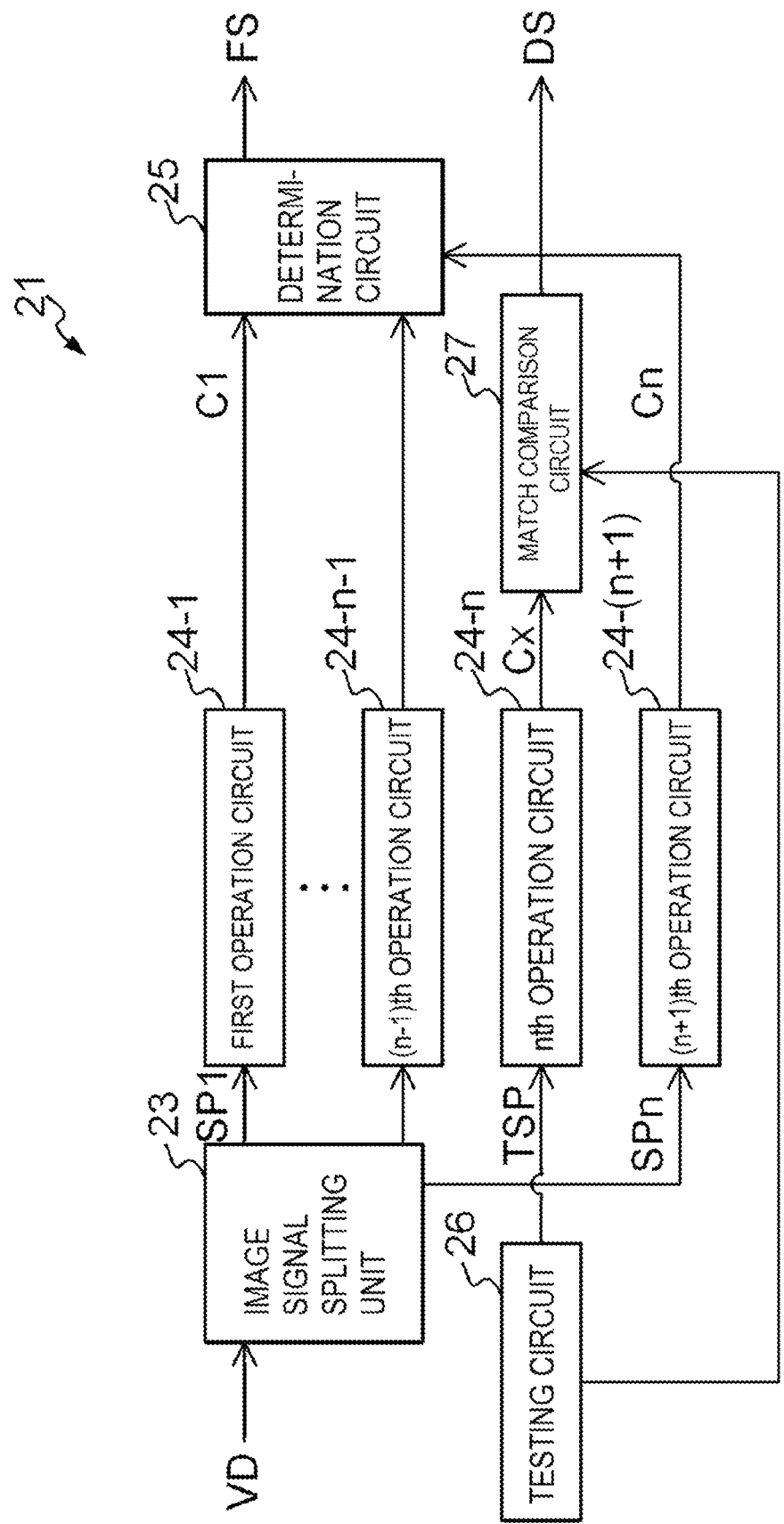
FIG. 4B is a block diagram schematically showing the connective relationship when performing a test on an nth operation circuit in Embodiment 1.

FIG. 4B is a block diagram schematically showing the supply relationship when testing the nth operation circuit. Similar to FIG. 4A, the switching circuit block 28, the selector 29, and the control circuit 30 are omitted from the drawing.

The first operation circuit 24-1 to the (n−1)th operation circuit 24-(*n*−1) and the (n+1)th operation circuit 24-(*n*+1) perform an operation after receiving the split image signals SP1 to SPn from the image signal splitting unit 23, and supply the image change detection signals C1 to Cn that are the operation results to the determination circuit 25. The nth operation circuit 24-*n* performs an operation after receiving the test split image signal TSP from the testing circuit 26 and supplies the image change detection signal Cx that is the operation result to the match comparison unit 27. The match comparison unit 27 compares the image change detection signal Cx to an expected value, and outputs the anomaly detection signal DS indicating "no anomaly" or "anomaly" on the basis of the comparison results.

In this manner, a test to determine whether an anomaly has occurred is performed for each of the first operation circuit 24-1 to the (n+1)th operation circuit 24-(*n*+1) while sequentially switching the operation circuit to be tested.

The determination circuit 25 may consider the operation result outputted from the operation circuit that was determined to have encountered an anomaly as the image change detection signal indicating "no change" to determine whether or not the image is frozen, or exclude the operation results from serving as a basis for determination.

Figure 5:
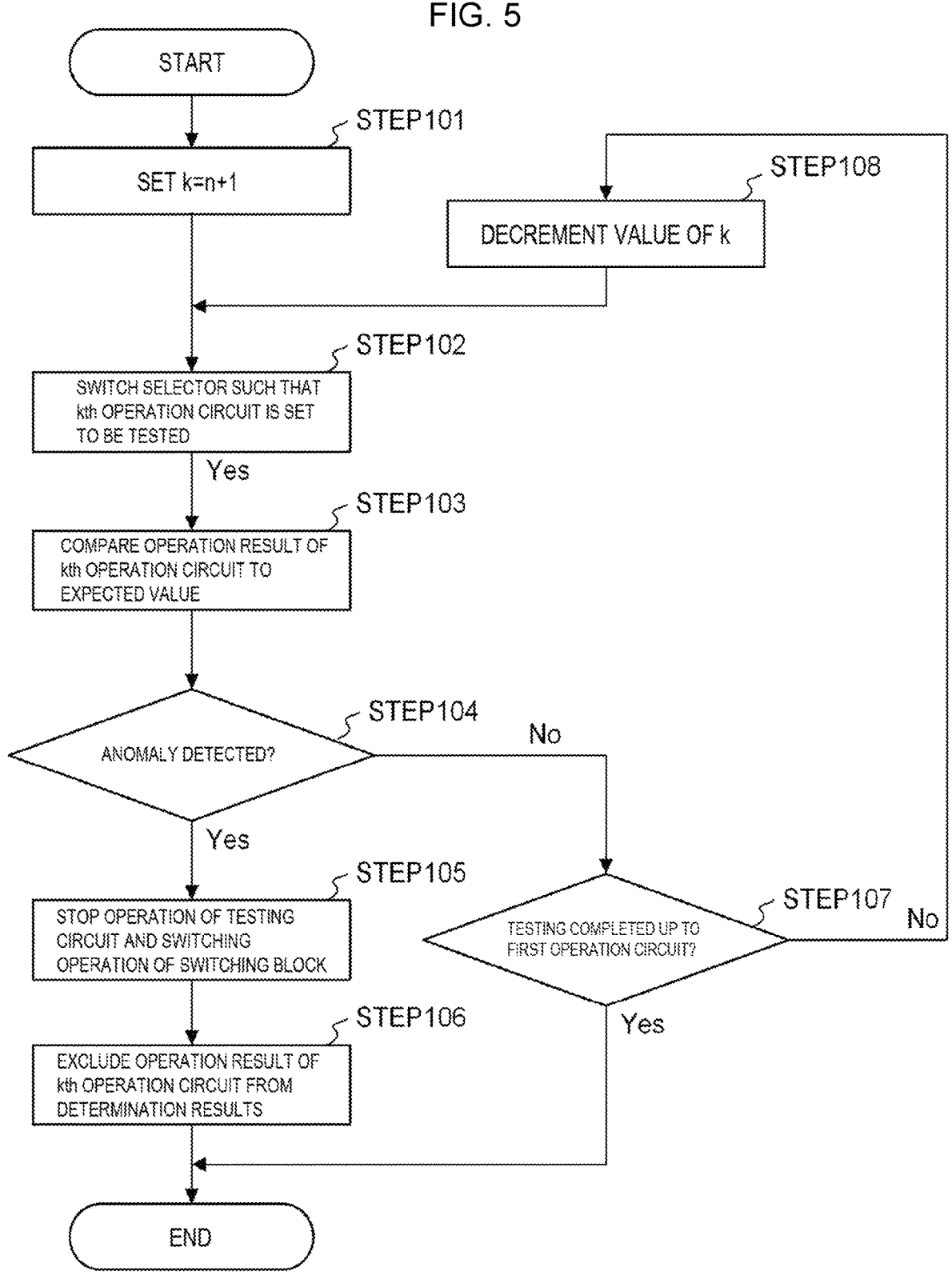
FIG. 5 is a flowchart showing a processing routine for a host device anomaly detection process according to an embodiment of the present invention.

Next, a general flow of operations by the image freeze detection circuit 21 of the present embodiment will be described with reference to the flowchart of FIG. 5. Here, the operations will be described with an example in which determination as to whether or not the image is frozen is performed with the operation results from the operation circuit determined to have encountered an anomaly being excluded. Also, in this description, the operation circuit being tested is referred to as the kth operation circuit 24-*k* (k being an integer that satisfies 1≤k≤(n+1)).

The control circuit 30 first sets the value of k, which indicates the operation circuit to be tested, to k=n+1 (STEP 101).

The control circuit 30 performs switching of the switching circuit block 28 and the selector 29 so as to set the kth operation circuit 24-*k* to be tested (STEP 102). As a result, the test split image signal TSP outputted from the testing circuit 26 is supplied to the kth operation circuit 24-*k*. The kth operation circuit 24-*k* performs an operation using the test split image signal TSP and outputs the image change detection signal Cx that is the operation result. The image change detection signal Cx is supplied to the match comparison circuit 27 via the selector 29.

The match comparison circuit 27 compares the image change detection signal Cx to an expected value (STEP 103). If the image change detection signal Cx matches the expected value, the match comparison circuit 27 outputs an anomaly detection signal DS indicating "no anomaly," while outputting an anomaly detection signal DS indicating "anomaly" if the image change detection signal Cx does not match the expected value.

The control circuit 30 determines whether an anomaly has been detected in the kth operation circuit 24-*k* on the basis of the anomaly detection signal DS outputted from the match comparison circuit 27 (STEP 104).

If it is determined that an anomaly has been detected (STEP 104: yes), then the control circuit 30 controls the testing circuit 26 to stop the supply operation of the test split image signal TSP and stops the switching operation of the switching circuit block 28 (that is, the operation for sequentially switching the operation circuit to be tested) (STEP 105). The determination circuit 25 excludes, from determination of whether the image is frozen, the operation results of the kth operation circuit 24-*k* where an anomaly was detected (STEP 106).

On the other hand, if it is determined that an anomaly has not been detected (STEP 105: yes), then the control circuit 30 determines whether testing up to the first operation circuit 24-1 has been completed, or in other words, whether testing for all operation circuits has been completed (STEP 107).

If it is determined that testing up to the first operation circuit 24-1 has not been completed (STEP 107: no), then the control circuit 30 switches the operation circuit to be tested while decrementing the value of k by 1 (STEP 108), returns to STEP 102, and executes the testing process again. In STEP 107, if it is determined that testing up to the first operation circuit 24-1 has been completed (STEP 107: yes), the process ends.

By the above processing routine, testing to determine whether an anomaly has occurred in each of the operation circuits is performed.

The image freeze detection circuit 21 of the present embodiment has n+1 operation circuits, and testing is executed to determine whether an anomaly has occurred in one of these operation circuits, while the typical operation for detecting image freeze is executed by the remaining n operation circuits. The operation circuit to be tested is sequentially switched, and testing is performed for all n+1 operation circuits.

According to this configuration, in a detection circuit having a plurality of operation circuits, there is no need to provide a separate host device diagnosis circuit having a plurality of operation circuits that execute similar operations in order to detect anomalies in the operation circuits, and thus, it is possible to detect anomalies that occur in the operation circuits without an increase in circuit size.

According to the image freeze detection circuit of the present embodiment, it is possible to perform detection of anomalies in each of the operation circuits in conjunction with the operations of the plurality of operation circuits without an increase in circuit size.

Embodiment 2

Next, Embodiment 2 of the present invention will be explained. The image freeze detection circuit of the present embodiment differs from the image freeze detection circuit 21 of Embodiment 1 by having one more operation circuit than in Embodiment 1, and by setting, as a general rule, two operation circuits at a time as the selected circuits for testing.

Figure 6A:
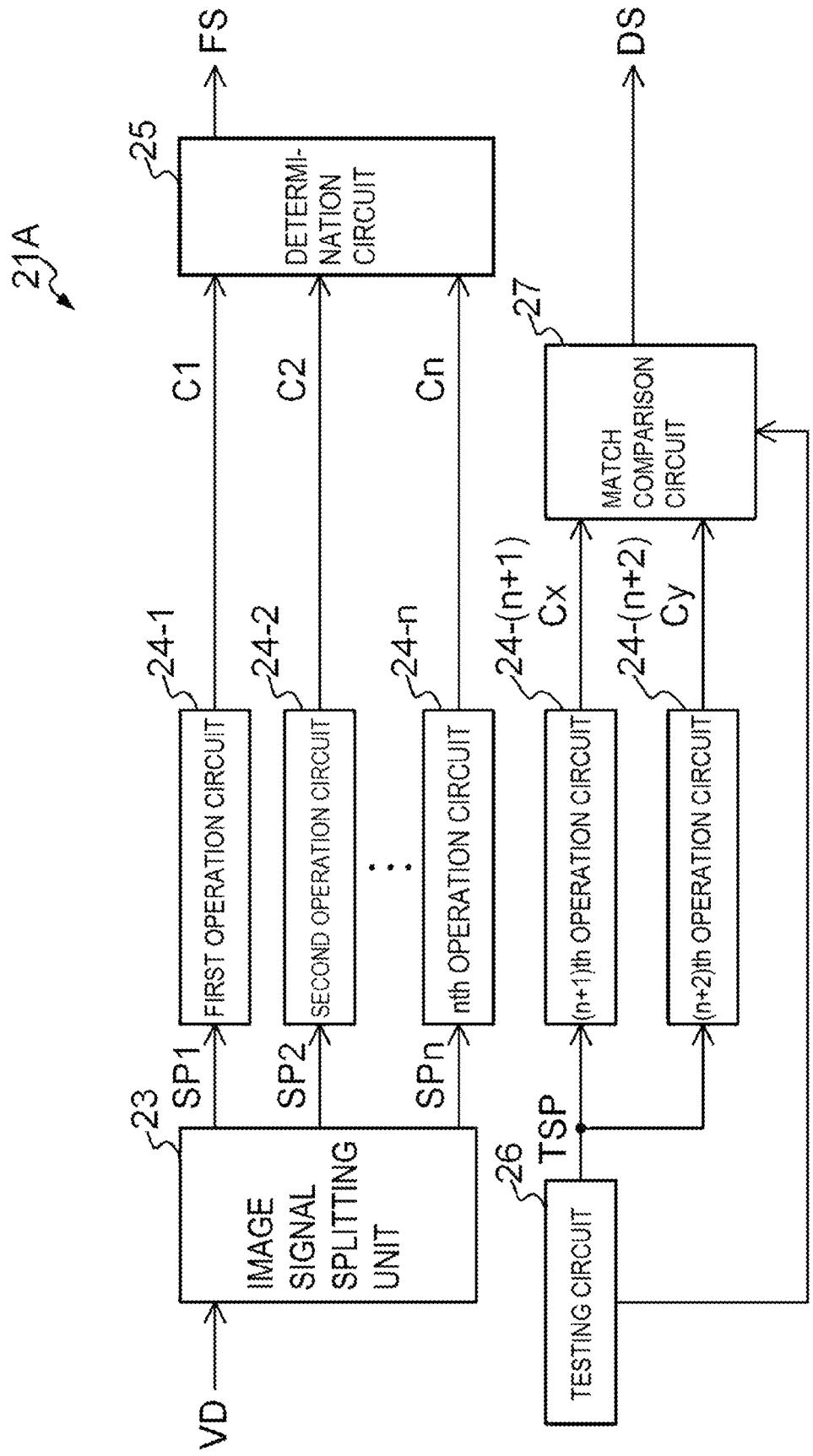
FIG. 6A is a block diagram schematically showing the connective relationship when performing a test on an (n+2)th operation circuit and an (n+1)th operation circuit in a second embodiment (Embodiment 2) of the present invention.

FIG. 6A is a block diagram showing a schematic configuration of the image freeze detection circuit 21A of the present embodiment. Here, the switching circuit block provided between each operation circuit and the image signal splitting unit 23 and the testing circuit 26, the selector provided between each operation circuit and the match comparison circuit 27, and the control circuit executing the switching control therefor are omitted from the drawing.

The image freeze detection circuit 21A has an (n+2)th operation circuit 24-($n$+2) in addition to the first operation circuit 24-1 to the (n+1)th operation circuit 24-($n$+1). In other words, the image freeze detection circuit 21A of the present embodiment has one more operation circuit than the image freeze detection circuit 21 of Embodiment 1.

The control circuit (not shown) of the image freeze detection circuit 21A performs switching of each selector in the switching circuit block (not shown in FIG. 6A; see FIG. 2) provided between the testing circuit 26 and the first operation circuit 24-1 to the (n+2)th operation circuit 24-($n$+2) such that the test split image signal TSP outputted from the testing circuit 26 is supplied to two operation circuits.

As shown in FIG. 6A, for example, first, the (n+1)th operation circuit 24-($n$+1) and the (n+2)th operation circuit 24-($n$+2) are selected as the operation circuits to be tested (that is, the selected circuits). The test split image signal TSP is supplied to the (n+1)th operation circuit 24-($n$+1) and the (n+2)th operation circuit 24-($n$+2), and the split image signals SP1 to SPn are supplied to the first operation circuit 24-1 to the nth operation circuit 24-*n*.

The (n+1)th operation circuit 24-($n$+1) and the (n+2)th operation circuit 24-($n$+2) supply the image change detection signals Cx and Cy that are the operation results to the determination circuit 27. The first operation circuit 24-1 to the nth operation circuit 24-*n* supply the image change detection signals C1 to Cn that are the operation results to the determination circuit 25. The determination circuit 25 performs determination as to whether the captured image is frozen. The match comparison circuit 27 compares the image change detection signals Cx and Cy to an expected value to determine whether an anomaly has occurred in the (n+1)th operation circuit 24-($n$+1) and the (n+2)th operation circuit 24-($n$+2).

If testing of the (n+1)th operation circuit 24-($n$+1) and the (n+2)th operation circuit 24-($n$+2) is completed and it is determined that neither has encountered an anomaly, the control circuit controls the selected switching circuit block (not shown) and switches the operation circuits to be tested to the (n−1)th operation circuit 24-($n$−1) and the nth operation circuit 24-*n*. The match comparison circuit 27 determines whether an anomaly has occurred in the (n−1)th operation circuit 24-($n$−1) and the nth operation circuit 24-*n*.

Similarly thereafter, the pair of operation circuits to be tested is switched and two operation circuits at a time are tested. If, for example, n is an even number, up to the first operation circuit 24-1 and the second operation circuit 24-2 are tested. If n is an odd number, up to the second operation circuit 24-2 and the third operation circuit 24-3 are tested, and lastly, only the first operation circuit 24-1 is tested.

In the image freeze detection circuit 21A of the present embodiment, if an anomaly is detected in one of the pair of operation circuits being tested, switching of the operation circuit to be tested is performed in a manner similar to Embodiment 1 such that one operation circuit at a time is tested thereafter.

Figure 6B:
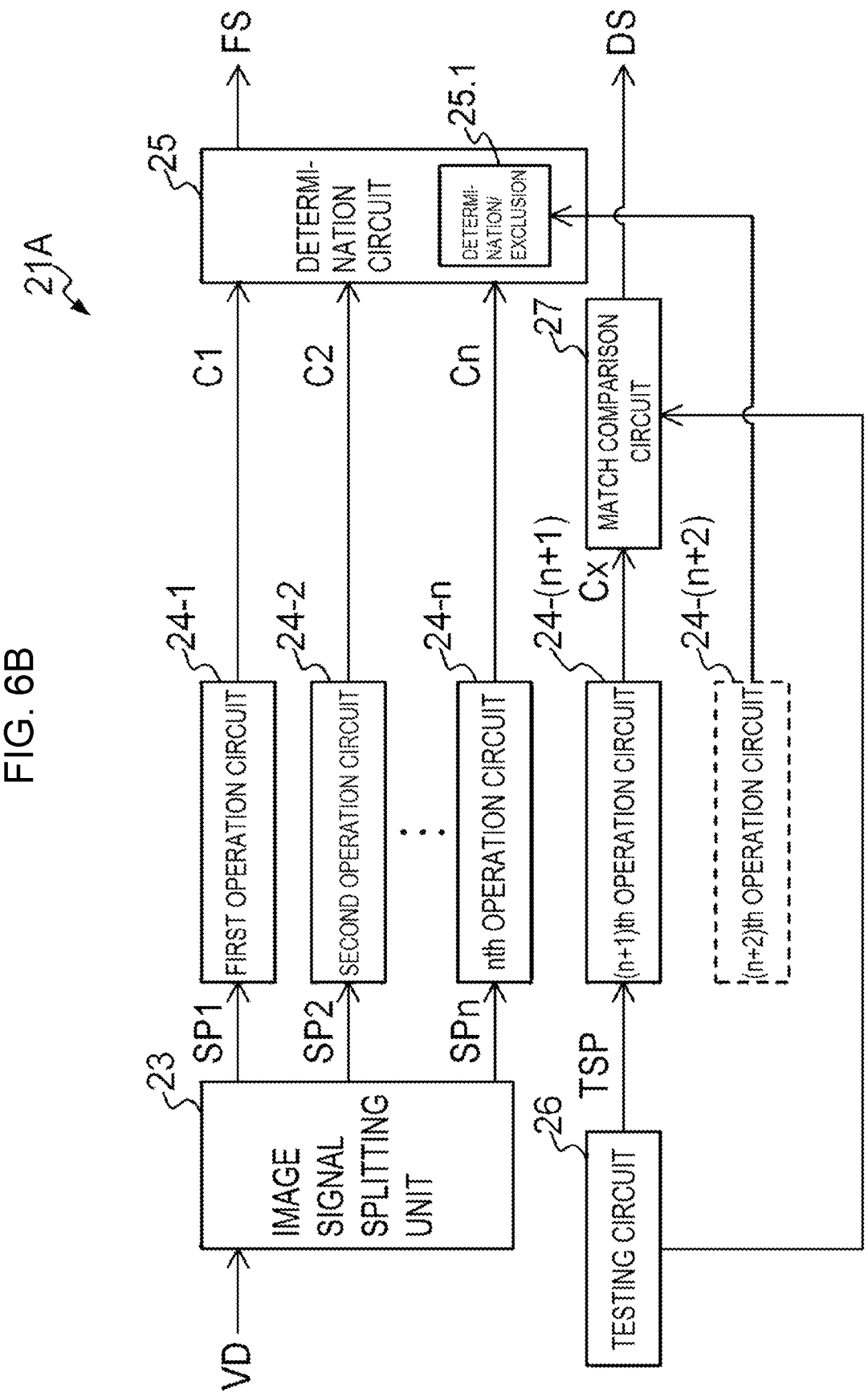
FIG. 6B is a block diagram schematically showing the connective relationship when performing a test on the (n+1)th operation circuit if an anomaly is detected in the (n+2)th operation circuit in Embodiment 2.

FIG. 6B is block diagram schematically showing a case in which an anomaly is detected in the (n+2)th operation circuit 24-(*n*+2). The determination circuit 25 (which includes a determination/exclusion function 25.1) performs determination as to whether the image is frozen while excluding the operation results of the (n+2)th operation circuit 24-(*n*+2) where an anomaly was detected. The control circuit switches the operation circuit to be tested one at a time in the order of the nth operation circuit 24-*n*, the (n−1)th operation circuit (n−1), . . . and the first operation circuit 24-1. As a result, testing is performed for all operation circuits other than the (n+2)th operation circuit 24-(*n*+2).

According to the configuration of the image freeze detection circuit 21A of the present embodiment, even if an anomaly is determined to have occurred in one of 1 to (n+2)th operation circuits, it is possible to continue testing other operation circuits. Thus, it is possible to continue the previous operation of testing each operation circuit in conjunction with the operations by the plurality of operation circuits, and therefore, it is possible to execute the image freeze detection operation without decreasing efficiency.

The present invention is not limited to the embodiments above. In the embodiments above, for example, a case was described in which the testing circuit 26 supplies the test split image signal TSP to the operation circuit to be tested and the match comparison circuit 27 compares the image change detection signal Cx outputted from the operation circuit being tested to an expected value read from the storage unit, to detect an anomaly. However, the testing circuit 26 and the match comparison circuit 27 may be formed together as an integral unit.

Also, Embodiment 1 describes a configuration in which the operation circuit selected to be tested is switched sequentially from the (n+1)th operation circuit 24-(*n*+1) to the first operation circuit 24-1. However, the order in which to select the operation circuit to be tested is not limited to this order. For example, the operation circuit to be tested may be switched so as to be selected in the order of the first operation circuit 24-1 to the (n+1)th operation circuit 24-(*n*+1), or switching may be performed such that the operation circuit to be tested is selected at random. Similarly for Embodiment 2 as well, the order in which to select the pair of operation circuits to be tested is not limited to the order described in the embodiment.

Also, in the embodiments above, a case was described in which the switching of the selectors of the switching circuit block 28 and the selector 29 is performed on the basis of the horizontal synchronizing signal timing. However, the timing in which to switch the selectors is not limited to this timing. For example, switching may be performed every prescribed period at a timing other than the horizontal synchronizing signal timing. Essentially, any timing may be selected as long as the selector is switched such that the n+1 operation circuits in Embodiment 1 and n+2 operation circuits in Embodiment 2 are sequentially selected to be tested.

Additionally, the configuration shown in FIG. 2 of the embodiment above can be applied to circuits other than the image freeze detection circuit. That is, the configuration may be applied to other circuits as long as n pieces of data attained by splitting the input signal are supplied to n operation circuits among the n+1 operation circuits, the test data is supplied to one operation circuit, and the operation circuit to be supplied the test data can be switched sequentially. According to this configuration, it is possible to sequentially execute anomaly detection of the operation circuit while the n operation circuits execute operations.

In Embodiment 1, one operation circuit at a time is selected to be tested, and in Embodiment 2, two operation circuits at a time are selected to be tested. However, the number of operation circuits to be selected for testing is not limited to this number. For example, the circuit may be configured such that the operation circuit block has n+k (k being an integer of 3 or greater) operation circuits, and k operation circuits are sequentially selected as operation circuits to be tested.

What is claimed is:

1. A signal processing circuit, comprising:
n+1 (n being an integer of 2 or greater) operation circuits, each of which is configured to execute a prescribed operation process on inputted data;
a signal supply circuit configured to receive n pieces of input data extracted from an input signal and receive test data inputted separately from the n pieces of input data, sequentially select one operation circuit among the n+1 operation circuits and supply the test data to the one selected operation circuit, and supply the n pieces of input data to n operation circuits other than the one operation circuit among the n+1 operation circuits; and
an anomaly determination circuit configured to determine whether an anomaly has occurred in the one operation circuit on the basis of an operation result of an operation on the test data by the one operation circuit;
wherein the input signal is an image signal corresponding to a series of frames, and
wherein the signal processing circuit further comprises an image signal splitting unit configured to receive the image signal, generate n split image signals by splitting the image signal corresponding to each frame among the series of frames, and supply the n split image signals to the signal supply circuit as the n pieces of input data.

2. The signal processing circuit according to claim 1, wherein the anomaly determination circuit is configured to perform a comparison of the operation result of the operation on the test data by the one operation circuit to an expected value for when the prescribed operation process is executed on the test data, and determine whether an anomaly has occurred in the one operation circuit on the basis of a result of the comparison.

3. The signal processing circuit according to claim 1, wherein the signal supply circuit is configured to switch an operation circuit to be selected as the one operation circuit on the basis of the image signal.

4. The signal processing circuit according to claim 1, wherein each of the n operation circuits other than the one operation circuit among the n+1 operation circuits executes an operation of detecting whether there is a change in an image corresponding to the image signal, between frames of the series of frames of the image signal, on the basis of the n split image signals.

5. The signal processing circuit according to claim 4, further comprising:
a determination circuit configured to receive operation results from the n operation circuits, and determine whether the image signal is frozen on the basis of the received operation results.

6. The signal processing circuit according to claim 3, wherein each of the n operation circuits other than the one operation circuit among the n+1 operation circuits executes an operation of detecting whether there is a change in an image corresponding to the image signal, between frames of the series of frames of the image signal, on the basis of the n split image signals.

7. A signal processing circuit, comprising:
n+k (n and k being integers of 2 or greater) operation circuits, each of which is configured to execute a prescribed operation process on inputted data;
a signal supply circuit configured to receive n pieces of input data extracted from an input signal and receive test data inputted separately from the n pieces of input data, sequentially select k operation circuits among the n+k operation circuits as selected circuits and supply the test data to the selected circuits, and supply the n pieces of input data to operation circuits other than the selected circuits among the n+k operation circuits; and
an anomaly determination circuit configured to determine whether an anomaly has occurred in the selected circuits on the basis of operation results of operations on the test data by the selected circuits;
wherein the input signal is an image signal corresponding to a series of frames, and
wherein the signal processing circuit further comprises an image signal splitting unit configured to receive the image signal, generate n split image signals by splitting the image signal corresponding to each frame among the series of frames, and supply the n split image signals to the signal supply circuit as the n pieces of input data.

8. The signal processing circuit according to claim 7, wherein the signal supply circuit is configured to, if an anomaly is determined to have occurred in one operation circuit among the k operation circuits selected as the selected circuits, sequentially select k−1 operation circuits as the selected circuits from among n+k−1 operation circuits other than the one operation circuit.

* * * * *